Figure 1:
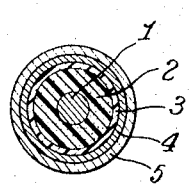

United States Patent Office 3,309,458
Patented Mar. 14, 1967

3,309,458
COAXIAL CABLE WITH FOAMED RESIN DIELECTRIC BOUND BY A THIN FILM OF SOLID RESIN DIELECTRIC
Masamichi Yoshimura and Akira Nato, both of Tokyo-to, Japan, assignors to Fujikura Densen Kabushiki Kaisha, Tokyo-to, Japan
Filed Mar. 1, 1966, Ser. No. 530,983
4 Claims. (Cl. 174—107)

This application is a continuation-in-part of application Ser. No. 208,375, filed July 9, 1962, and now abandoned.

This invention relates to coaxial cable of unique construction. This coaxial cable is provided with an insulating separator made of a relatively brittle, and therefore hard also, foamed synthetic resin. Heretofore, it has not been possible to make satisfactory coaxial cable having an insulating separator made of a brittle foamed synthetic resin, because such a separator, due to its brittleness, would crumble when the coaxial cable would be flexed or bent.

In almost all coaxial cables produced at present, polyethylene is used as the insulating separator between the inner conductor and the outer conductor. The polyethylene is either in the form of a foam or in the form of a solid sheath or disc.

Solid sheaths of polyethylene are generally less preferred than polyethylene foam or discs because they do not provide as low a dielectric constant as the foam or discs. Insulating separators of the disc type can be made to have extremely low effective dielectric constants in comparison with the solid sheath type. Disc type insulating separators can be made to have dielectric constants on the order of 1.1 to 1.2. However, as the polyethylene discs are fitted, with spaces therebetween, onto the center or inner conductor, the disc type insulating separator thereby constructed lacks mechanical strength, particularly when the coaxial cable is bent, and therefore coaxial cables provided with such an insulating separator must be handled with great care and are limited in their utility.

In the case of the foamed type polyethylene separator, although it is possible, by regulating the degree of foaming of the polyethylene, to cause the separator to have a dielectric constant on the order of 1.4, a further increase in the degree of foaming causes an increase in the softness of the foamed polyethylene, whereby the foamed polyethylene becomes inadequate in mechanical strength to be used as an insulating separator. Accordingly, it is not feasible to lower the dielectric constant further. The lack of mechanical strength herein referred to is especially a lack of radial rigidity which causes the radial dimension of the insulating separator to decrease when the coaxial cable is bent, thus decreasing its effectiveness.

The use of a relatively hard and brittle material such as polystyrene as the insulating separator material has been proposed in the past but, because of difficulties in fabrication and use of cables employing such a material, it has not been successfully reduced to practice.

It is an object of the present invention to provide a coaxial cable having an insulating separator or insulator of low dielectric constant comparable to that of a polyethylene disc type separator yet having substantial strength and flexibility comparable to that of a coaxial cable having a polyethylene sheath type insulating separator.

It is another object of this invention to provide a coaxial cable comprising an inner conductor, an insulator circumferentially of the inner conductor, the insulator comprising a brittle foamed synthetic resin and an outer layer of a synthetic resin pliable in comparison with the foamed resin, having a melting point no higher than the melting point of the foamed resin and bonded intimately with the foamed resin, an outer tubular electrical conductor disposed coaxially and circumferentially of the inner conductor and extending coextensively with the inner and outer conductors, and an outer insulating cover circumferentially of the outer conductor. Such a construction is particularly suitable for relatively small diameter coaxial cables.

It is still another object of this invention to provide a coaxial cable having two insulators as described above, arranged concentrically. Such a construction is particularly suitable for coaxial cables of relatively large diameter.

Figure 2:
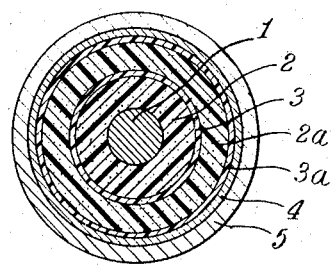

The invention will now be described in detail, with reference to the accompanying drawings in which:

FIGS. 1 and 2 are cross sectional views showing embodiments of the coaxial cable produced by using the method and the apparatus of the invention;

FIGS. 3A, 3B, 3C, and 4 through 7, inclusive, are schematic diagrams of a method and apparatus for fabricating coaxial cable of the invention, which diagrams are to be referred to in the description hereinafter of the method and apparatus of fabricating coaxial cable of the invention.

A suitable construction for coaxial cables of the invention of relatively small diameter comprises a center or inner conductor 1, an insulating separator 2 made of a relatively hard and brittle foamed synthetic resin, preferably foamed polystyrene, which is formed concentrically about the inner conductor 1, a flexible or supple synthetic resin film layer 3 having a softening point which is no higher than the softening point of the foamed synthetic resin, for example polyethylene film, intimately bonded to the outer surface of the insulating separator 2, an outer conductor 4 formed concentrically about the outer surface of the layer 3, and an outer cover layer 5 including a wrapping of a shielding tape and a wrapping of a binding tape (FIG. 1).

It is a unique and important feature of the coaxial cable of the present invention that the insulating separator 2, made of a relatively hard, brittle, foamed synthetic resin, is enclosed on its outer surface by an intimately cohering, thin film 3 made of a supple or flexible synthetic resin having a softening point which is no higher than the melting point of the foamed synthetic resin of the insulating separator. If only a brittle foamed synthetic resin, such as polystyrene, were used, it would be extremely fragile, and even a slight bending would cause cracks to develop in this material, which would then disintegrate. However, by covering the foamed separator with an intimately cohering supple film layer 3, for example, of polyethylene, according to this invention, the fragility of the foamed resin itself is compensated for, whereby cracks do not easily develop when the cable is subjected to the bending expected in normal use.

A suitable construction for coaxial cables of the invention of relatively large diameter comprises, in concentric disposition and in the sequence named from the center outward, a center or inner conductor 1, an insulating separator 2 made of a relatively hard, brittle foamed synthetic resin, such as foamed polystyrene, a flexible or supple synthetic resin thin film layer 3 having a softening point which is no higher than and preferably lower than the softening point of the foamed synthetic resin, for example, a polyethylene film, cohering intimately with the outer surface of the separator 2, an insulating separator 2a made of a relatively hard, brittle foamed synthetic resin, for example, polystyrene, the separator 2a being formed about and cohering intimately with the outer surface of the layer 3, a flexible or supple synthetic resin thin film layer 3a having a softening point which is no higher than the softening point of the foamed synthetic resin, for example, polyethylene film, cohering intimately with the outer surface of the separator 2a, an outer conductor 4 and an outer cover layer 5 including a shielding tape wrapping and a binding tape wrapping (FIG. 2).

Longitudinal seams of the materials may simply be butt joined and since there is a wrapping of tape no sealing of the seams is required.

The coaxial cables illustrated in FIGS. 1 and 2 can be fabricated by the methods and apparatus described below with reference to FIGS. 3A, 3B, 3C, 4, 5, 6 and 7.

Figure 3A:
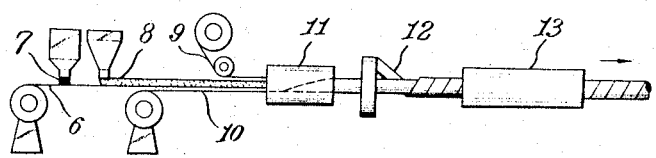
Figure 3B:
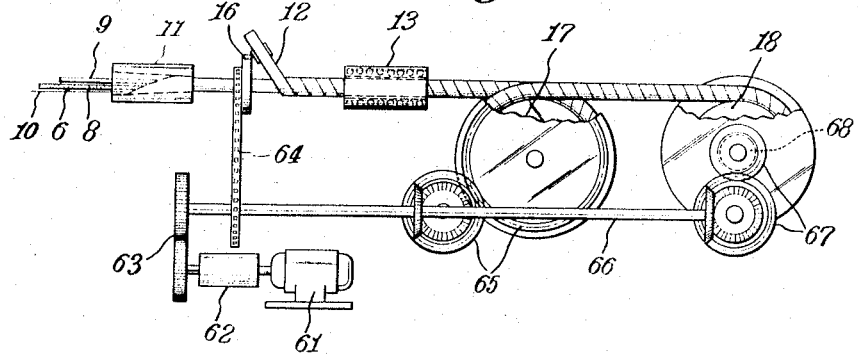

In the apparatus illustrated in FIGS. 3A and 3B, a flexible synthetic resin tape 6 having a relatively low melting point, for example, a polyethylene tape, is supplied continuously from a feeding means and is run in a substantially straight line along the process line. First a continuous supply of adhesive or solvent 7 is applied by spraying onto the upper surface of the polyethylene tape 6 and then, onto this, relatively hard and brittle synthetic resin chips 8 which have been treated to be foamable, but have not yet been foamed, for example, foamable polystyrene chips, are uniformly distributed. The foamable polystyrene chips may be obtained, for example, by steeping conventional unfoamable polystyrene chips of a size on the order of 0.5 to 1.1 mm. for 24 hours at room temperature in petroleum ether having a boiling point of 60 to 65° C. and methylene chloride or in hexone and methanol. Methods of making foamable polystyrene chips are well known, do not per se constitute the present invention and essentially any may be used. Above and along the distributed chips, the center conductor 9 is supplied continuously, while material 10, for example, copper tape, for the outer conductor is continuously supplied below and along the lower surface of the polyethylene tape 6. The foregoing materials are fed through a forming apparatus 11, where, about the center conductor 9, the foamable polystyrene chips 8, the polyethylene tape 6, and the outer conductor 10 are successively formed in the longitudinal direction into a covering of concentric construction.

The forming apparatus 11 is composed of a guiding part, a forming part and a die part.

At the guiding part, the outer conductor 10, the polyethylene tape 6, the polystyrene chips 8 spread over the tape 6 and the center conductor 9 are so arranged as to be superimposed in sequence and then they are passed through a path provided within the forming apparatus. The path of the forming part has a wall surface whose curvature gradually increases so as to decrease the cross sections of the materials as they advance; thereby, the curvature of each material is made to increase gradually in the cross section so as to surround the conductor 9 as the center.

The curvature of the wall surface of the forming part gradually increases until at the terminal portion of the forming apparatus 11, the wall surface constitutes a circular hole, and this terminal portion is the die part. When each of the above referred to materials including the center conductor 9 passes through the said die part, the respective material is shaped in a concentric form around the center conductor 9, the outer conductor 10 being shaped in a cylindrical form with both edges of the conductor tape contacting each other.

Next, this product assembly, after leaving the forming apparatus 11, is wrapped with one or more layers of shielding tape and binding tape 12. The thusly wrapped intermediate product is then passed through a heating apparatus 13. During its passage through the heating apparatus 13, the intermediate product is heated to a temperature of from 110 to 120° C., whereby the unfoamed polystyrene chips 8 are caused to foam, and simultaneously, the individual chips are caused to cohere intimately together into an integral body to form a layer of foamed polystyrene. At the same time, the polyethylene tape is bonded cohesively onto the outer surfaces of the foamed polystyrene layer.

The heating apparatus 13 has, for example, a cylindrical passageway inside of which is installed an electric heating coil to evenly radiate heat from the inner surface of the passageway. The heat generated in this apparatus is first carried to the polyethylene tape 6 through binding tape 12 and outer conductor 10; then it is transmitted to polystyrene chips 8. Therefore, in order to heat the polystyrene chips 8 to a temperature of from 110 to 120° C. while the intermediate product travels through the heating apparatus 13, it is necessary to heat tape 6 to a much higher temperature because there exists a temperature gradient between outer and inner parts of the product; in other words, the atmosphere outside the cable should be maintained at higher temperature. Consequently, the temperature of the atmosphere to be heated by the heating apparatus 13 should be determined by the length of the heating apparatus 13 as well as the forwarding speed of the intermediate product; in other words, it should be determined by the time during which the intermediate product is exposed to the heated atmosphere in the heating apparatus. In the case of a product of relatively small diameter, a suitable temperature of the atmosphere in this particular example would be approximately 120° C. at the center part of the path through the heating apparatus 13, provided that the forwarding speed of the cable is about 0.5 m./min. and the length of the path through the heating apparatus 13 is about 1 meter.

When the foamable material is foamable polystyrene it is generally undesirable to heat the polystyrene to a temperature higher than about 120° C. because a higher temperature causes bubbles to be expelled from the polystyrene, preventing the formation of foamed (i.e., cellular) structure, destroying the cellular structure. One of the reasons why polyethylene is one suitable material for tape 6 is that its softening point is about from 110° C. to 120° C., which corresponds to the foaming temperature of the polystyrene chips 8, and therefore as the polystyrene foams the polyethylene softens and therefore closely adheres to the outer surface of the foamed polystyrene layer. Another reason that polyethylene may constitute a part of the insulating separator for the coaxial cable and is quite suitable for such insulating separator is that it has excellent high-frequency electrical characteristics, e.g., low dielectric constant at high frequencies. Still another reason is that, as polyethylene tape is excellent in resiliency or pliability, it is capable of fully compensating for the fragility of foamed polystyrene, when it is closely adhered to the outer surface of the foamed polystyrene layer, and of preventing the polystyrene layer from cracking even if a bending force is applied to the cable. Any other material having a softening point no higher than the softening point of the foamed material and the other characteristics herein mentioned may alternatively be used.

Finally, by applying an outer covering onto the cable the fabrication of a coaxial cable as shown in FIG. 1 is completed. The above description relates to the case wherein unfoamed polystyrene chips are used, but the same result can be obtained even when an incompletely foamed material, e.g., polystyrene, is used as the foamable material.

Figure 3C:
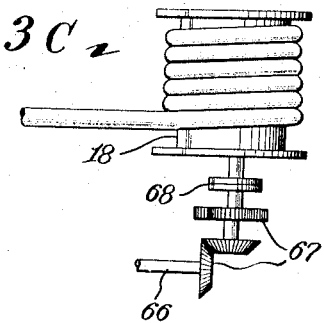

FIG. 3B is a schematic diagram, in elevation, and FIG. 3C, in plan, indicating the manner in which the flow of materials in the fabrication line is maintained. A take-up roll 17 applies tension on and takes up the finished cable at the required speed, and a wind-up device 18 winds up the cable leaving the take-up roll 17. These two devices, as well as other devices mentioned below may be driven by a common driving system of known type as described below.

The power from a motor 61 is suitably changed in rotational speed by a speed-change mechanism 62 and transmitted through gears 63 to a main drive shaft 66, to which gears and sprockets as necessary are fixed. A portion of the power from the main drive shaft 66 is transmitted through gears 67 and a friction coupling 68 to drive the wind-up device 18. Another portion of the power is transmitted through gears 65 to drive the take-up roll 17. Still another portion of the power is transmitted, for example, through a sprocket wheel fixed to the main drive shaft 66 and an endless chain 64, to drive the tape wrapper 16. FIG. 3C is a schematic diagram, in plan view, showing the wind-up device 18 and its driving mechanism.

Although the above-described take-up and wind-up means and the related driving system are omitted in the drawings of other fabrication apparatuses (FIGS. 4–7) and descriptions thereof, it is to be understood that similar means and systems are used in each case.

Figure 4:
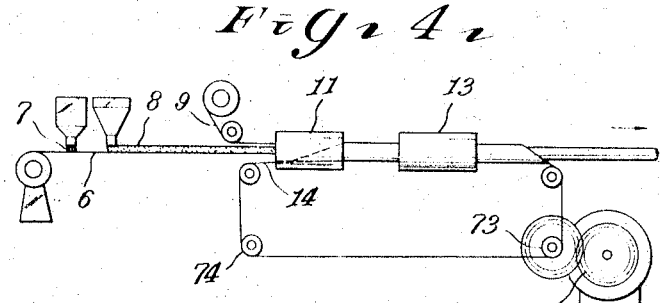
Figure 5:
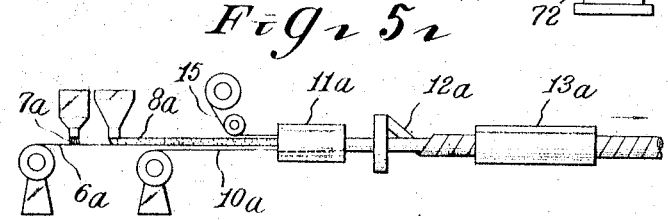

Coaxial cables of relatively large diameters, as exemplified by the embodiment shown in FIG. 2, can be fabricated in two process stages as indicated in FIGS. 4 and 5. In the apparatus indicated in FIG. 4, whereby the first stage of fabrication is accomplished, a flexible synthetic resin tape 8 having a relatively low melting point, for example, a polyethylene tape, is first supplied into the process line, and onto the upper surface thereof, an adhesive or solvent 7 is applied. On top of this, relatively hard and brittle flexible synthetic resin chips 8 which have been treated to be foamable, but have not yet been foamed, for example, foamable polystyrene chips, are distributed uniformly. Above and along this line of chips, the center conductor 9 is supplied. A foaming tape 14 is supplied below the polystyrene tape 6 and caused to accompany the foregoing materials through a foaming apparatus 11, where, about the center conductor 9, the foamable polystyrene chips 8, the polyethylene tape 6, and the foaming tape 14 are successively foamed in the longitudinal direction into a covering of concentric construction.

As should be apparent from the foregoing description, the difference between the process stage of FIG. 4 and the process of FIG. 3A is that, in FIG. 3A, the outer conductor 10 is utilized, while, in FIG. 4, the forming tape 14 is used. In the process of FIG. 4, when the forming tape 14 passes through the forming apparatus 11, its edges may be either brought into contact with each other or overlapped.

The partly fabricated cable, after leaving the forming apparatus 11, is immediately passed through a heating apparatus 13, in which the heating temperature is from 110° to 120° C. as in the case illustrated in FIG. 3. Accordingly, the foamable polystyrene chips 8 are foamed and form the inner foamed polystyrene layer, and thereabout the polyethylene tape 6 is caused to be adhesively bonded.

The foamable polystyrene chips 8 and the polyethylene tape 6 surrounding the center conductor 9 are supported by the forming tape 14. Accordingly, it is desirable that the section of the cylindrical passageway of the heating apparatus shown in FIG. 4 be the same or essentially the same as the section of the die part of the forming apparatus 11. In addition to considering the forwarding speed of the partly fabricated cable, heating time within the heating apparatus 13, or heating temperature of the atmosphere as explained with reference to FIG. 3A, it is necessary in this case, to take into consideration the fact that the forming tape 14 has a different heat conductivity from an outer conductor. In the case of a coaxial cable of relatively large diameter, an example of a suitable temperature is about 120° C. in the center part of the path, provided that the forwarding speed of the cable is about 0.5 m./min. and the length of the path of the heating apparatus 13 is about 2 meters.

The forming tape 14 may be made of polytetrafluoroethylene or other flexible heat resistant material. However, the forming tape 14, unlike the outer conductor, cannot maintain the partly fabricated cable in uniform shape as the polystyrene chips 8 foam, and, itself, is not caused by the heating in the heating apparatus 13 to melt or to be bonded adhesively to the polyethylene tape 6.

Moreover, if the selected material such as polytetrafluoroethylene itself, does not stick but slides well, the process step of peeling off tape 14 prior to passing the semi-finished cable to the second stage process is facilitated.

The forming tape 14 may be of endless form as illustrated in FIG. 4, in which case it is supported movably on rollers 74 and driven by a driving roll 73, which, in turn, is driven by a motor 71 through gears 72.

After the semi-finished cable leaves the heating apparatus 13, the forming tape 14 is peeled off, and the semi-finished cable enters the second stage process, which is indicated in FIG. 5. This process is the same as that indicated in FIG. 3 except that the center conductor 9 is replaced by the semi-finished cable or "line core" 15 fabricated in the first stage process. That is, polyethylene tape 6a is fed into the process line and is coated on its upper surface with an adhesive or solvent 7a; foamable polystyrene chips 8a are distributed uniformly on the adhesive or solvent 7a; above and along this line of chips 8a, the semi-finished cable 15 fabricated in the first stage process is fed; the outer conductor material 10a is fed along the lower surface of the polyethylene tape 6a; the foregoing materials are passed through a forming apparatus 11a; shielding tape and binding tape 12a are wrapped about the partly fabricated cable, which is then passed through a heating apparatus 13a; and, finally, an outer cover is applied (not shown) to complete the coaxial cable shown in FIG. 2.

With respect to the temperature of the heating atmosphere in the heating apparatus 13 for enabling the polystyrene chips 8a to foam in the second stage process, an exemplary suitable temperature in the case of a coaxial cable of relatively large diameter is about 120° C. in the center part of the path provided that the forwarding speed of the cable is set about 0.5 m./min. and the length of the heating path of the heating apparatus 13a is about 2 meters.

At the point in the process where the semi-finished cable 15 is introduced, an adhesive or solvent may be applied on the outer surface of the semi-finished cable 15, but this step has been omitted in the drawing.

In the above described processes, the application of an adhesive or solvent is for the purpose of preventing the foamable chips on the tape from falling off at the time of forming and is not necessary provided that the chips do not fall off at the time of forming. Typically, benzene (solvent) may be used. Typical suitable adhesives are latex adhesives. However, any solvent or adhesive which will at least lightly adhere the chips to the tape is satisfactory.

Figure 6:
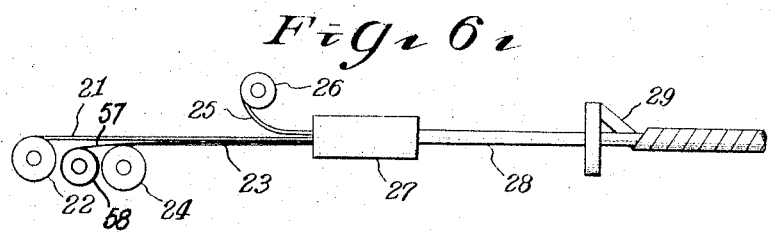

Other methods of fabricating coaxial cable of the present invention will now be described with reference to FIGS. 6 and 7. In the embodiment illustrated in FIG. 6, a relatively hard, brittle foamed synthetic resin sheet 21, for example, foamed polystyrene sheet material, is fed from a supply means 22. A flexible synthetic resin tape 57 having a relatively low melting point, for example, a polyethylene tape, is fed from the feeding device 58 along the under surface of the sheet 21. An electrically conductive tape 23, for example, copper tape, which will be the outer conductor of the coaxial cable, is fed below and along the lower surface of the tape 57 from a supply means 24. A center conductor material 25, for example, copper wire, is fed above and along the upper surface of the sheet 21 from a supply means 26.

The foregoing materials are passed through a forming apparatus 27 where the foamed synthetic resin sheet 21, the synthetic resin tape 57, and the electrically conductive tape 23 are successively formed to cover the center conductor 25. For this process step, it is necessary to heat the foamed synthetic resin sheet 21 in the forming die 27 or prior to its entering the die 27 so as to facilitate its forming, and to cause the synthetic resin tape 57 to be cohered to the outer surface of the sheet 21. For example, in the case of using a foamed polystyrene as the foamed synthetic resin sheet 21, a suitable temperature is from 110 to 120° C.

The forming apparatus 27 is of almost identical structure to the forming apparatus 11 described above with the exception that the former is further provided with a heating means. This heating means comprises a heater, e.g., electric, as in the heating apparatus 13 or 13a and heats the atmosphere within the forming apparatus 27. When the foamed synthetic resin sheet 21 is to be heated up to 110–120° C., the temperature of the heated atmosphere should be far higher than the desired temperature of the resin sheet 21. And, in the case of a coaxial cable of relatively small diameter, it is desirable to maintain the temperature of the atmosphere at 270° C., for example, provided that the forwarding speed of the cable is set at about 5 m./min. and the the length of the heating path of the forming apparatus 27 is 30 cm.

Subsequent to the above-described forming step, the product is in the form of a coaxial core 28, which is then wrapped with a binding tape 29.

In the above-described process, in the case wherein, for example, foamed polystyrene is use, such a resin of up to about a 97% degree of expansion (i.e., foamed volume 97% greater than unfoamed volume) can be easily made, and such a resin has sufficient flexibility for winding on the supply means 22, for example, a bobbin. In its original state, however, this resin cannot be formed into a cover about the center conductor along the longitudinal direction. This forming step, however, can be easily carried out by heating this resin to a temperature of for example from 110 to 120° C., as previously mentioned.

Furthermore, since the foamed synthetic resin sheet 21 and the synthetic resin tape 57 travel together with the electrically conductive tape 23, the foamed synthetic resin sheet 21 is not subjected to tension and, therefore, even though it is heated and assumes an easily formed condition, it is not longitudinally deformed. Accordingly, it is possible to attain excellent controllable forming.

Figure 7:
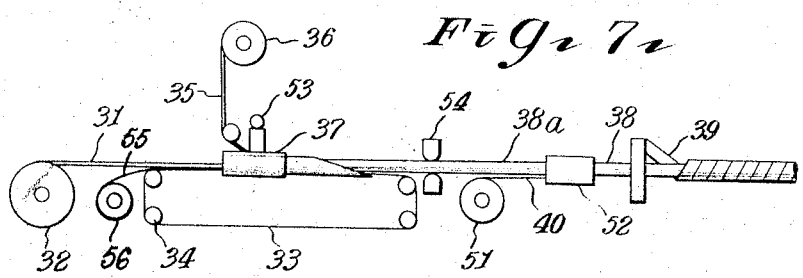

In the arrangement of apparatus shown in FIG. 7, which illustrates still another method, a relatively hard and brittle foamed synthetic resin sheet 31, for example, a foamed polystyrene sheet, is fed into the process line from a supply means 32. A flexible synthetic resin tape 55 having a relatively low melting temperature, for example, polyethylene tape, is fed from the feeding device 56 along the under surface of the sheet 31. An endless forming tape 33 is supported and circulated by a circulating mechanism 34 in such a manner that, at one portion thereof, the endless forming tape 33 travels together with the lower surface of the sheet 31 and with the tape 55 through a forming apparatus 37, thereby functioning as a forming tape. This endless forming tape 33 is made of such a material as, for example, polytetrafluoroethylene of relatively high melting point. A center conductor material 35 is fed from a supply means 36, along the upper surface of the foamed synthetic resin sheet 31, through the forming apparatus 37, which successively forms the foamed synthetic resin sheet 31, the synthetic resin tape 55 and the forming tape 33 about the center conductor 35. In this case, also similarly as in the case illustrated in FIG. 6, it is necessary to heat the foamed synthetic resin 31 at or just in front of the forming apparatus 37 so as to facilitate its forming and to make the synthetic resin tape 55 cohere to the outer surface of the layer of sheet 31, whereby a semi-finished cable 38a is fabricated. The above description relates to the use of a completely foamed synthetic resin sheet, but the same steps can be followed and results be obtained even when an incompletely foamed synthetic resin sheet is used as the foamable material.

The forming apparatus 37 is of construction like that of the forming apparatus 27 which is explained above with reference to FIG. 6.

The semi-finished cable 38a fabricated in the above manner is covered by the forming tape 33 while passing through the forming apparatus 37, but after it passes through the forming apparatus 37, the forming tape 33 parts from the semi-finished cable 38a. An outer conductor material 40 is fed from a supply means 51 and is led, together with the semi-finished cable 38a, into a second forming apparatus 52, where the outer conductor material 40 is formed about the semi-finished cable 38a to produce the almost completely fabricated cable 38 which then leaves the forming apparatus 52 and is wrapped by a binding tape 39 to result in the final product.

A centering device 53 for the center conductor 35 is provided in the forming apparatus 37 and is controlled through its coupled relation with an electrostic capacity measuring instrument 54 which is installed on the process line in the portion where the semi-finished cable 38a is exposed.

An example of this process is that when a coaxial cable of relatively small diameter is to be made and the sheet 31 is of polystyrene and the tape 55 is of polyethylene, the temperature of the atmosphere in the forming apparatus 37 may be 200° C. if the forwarding speed of the cable is set 2 m./min. and the length of the path through the forming apparatus 37 is 30 cm.

The speed of the endless forming tape 33 is adjusted to be the same as or somewhat lower than the take-up speed of the cable. The reason for any retardation of this speed is that the foamed synthetic resin sheet 31 in some instances is reduced in sectional area by the forming die 37, and its feeding speed in such instances becomes lower than the cable take-up speed.

Should it be desired to employ a process of the last described type to fabricate coaxial cable of relatively large diameter, two stages would be used as described above with reference to embodiments employing foamable chips. Assuming, for example, that the pliable insulating tapes are of polyethylene and the foam sheets are of polystyrene, an example of operating conditions would be as follows: in the first stage, a forwarding speed of the cable of 1 m./min., a length of the heating path of the forming apparatus 37 of 50 cm., and a temperature of the atmosphere in the heating path of 200° C.; in the second stage, a forwarding speed of the cable of 1 m./min., a length of the heating path of the forming apparatus 37 of 50 cm., and a temperature of the heating path of 200° C.

The fabrication of coaxial cable of the invention will now be further described by reference to the following specific examples:

*Example I*

Following the procedure, temperature and operating speed described above relative to making a coaxial cable of relatively small diameter with the use of chips of foamable material, the following are further details of the materials and conditions used: insulating tape of polyethylene, 14.5 mm. wide and 0.30 mm. thick; copper tape for outer conductor, 14.8 mm. wide and 0.18 mm. thick; foamable polystyrene chips, 0.8 mm. in diameter; copper wire of 1.2 mm. diameter as the inner conductor; distribution of the chips on the polyethylene tape, 5 chips per sq. cm.; outside diameter of the formed outer conductor 4.8 mm.

*Example II*

Following the procedure, temperature and operating speed described above for making a coaxial cable of relatively large diameter with the use of chips of foamable material, the following are the materials and conditions used for the first stage: insulating tape of polyethylene, 52 mm. wide and 0.4 mm. thick; foamable polystyrene chips, 1.0 mm. in diameter; copper wire 10 mm. in diameter as the inner conductor; distribution of the chips on the polyethylene tape, 6 chips per sq. cm. The conditions and materials used for the second stage were: insulating tape of polyethylene, 75 mm. wide and 0.4 mm. thick; copper tape for outer conductor, 76.6 mm. wide and 0.25 mm. thick; foamable polystyrene chips, 1.0 mm. in diameter; distribution of the chips of the polyethylene tape, 7 chips per sq. cm.; outside diameter of the foamed outer conductor, 24.5 mm.

*Example III*

A coaxial cable of relatively small diameter is made using the procedure, temperature and operating speed described above with reference to FIG. 6, and the following are additional details as to materials and conditions: as the foamed material, foamed polystyrene sheet having a degree of expansion of 90% (i.e., foamed volume is 90% greater than unfoamed volume), a width of 10 mm. and a thickness of 1.0 mm.; as the insulating tape, polyethylene tape having a width of 14.5 mm. and a thickness of 0.3 mm.; copper tape for the outer conductor, having a width of 14.8 mm. and a thickness of 0.3 mm. and having an outside diameter when formed into the tubular outer conductor of 4.8 mm.; copper wire 10 mm. in diameter as the inner conductor.

*Example IV*

A coaxial cable of relatively large diameter is made by the procedure described above with reference to FIG. 7, however feeding into the process line each from its own feed means a second insulating tape superposed above the outer conductor tape and a second foamed sheet superposed above the second insulating tape and heating the second foamed sheet for the second forming step in the same manner as the first foamed sheet was heated for the first forming step, to make it formable and to cause the second insulating tape to cohere to it in the second forming step, whereby the second foamed sheet and the second insulating tape as well as the outer conductor tape are formed as coaxial tubular sheaths about the partly fabricated cable. Both forming stages are operated at the speed and temperature referred to above with reference to FIG. 7 and additional details as to the conditions and materials that are used are: copper wire of 10 mm. diameter as the center conductor; foamed polystyrene sheet having a 90% degree of expansion, a width of 41 mm. and a thickness of 2.5 mm. as the first stage foamed sheet; polyethylene tape having a width of 52 mm. and a thickness of 0.4 mm. as the first stage insulating tape; foamed polystyrene sheet having a 90% degree of foaming, a width of 60 mm. and a thickness of 2.5 mm. as the second stage foamed sheet; polyethylene tape having a width of 75 mm. and a thickness of 0.4 mm. as the second stage insulating tape; copper tape having a width of 76.6 mm. and a thickness of 0.25 mm. as the outer conductor, which has a formed outside diameter of 24.5 mm.

In coaxial cable of the present invention as described in connection with FIGS. 1 through 5, since polystyrene, which itself has an extremely low dielectric constant, is caused to foam on the center conductor to form the insulating separator layer of the coaxial cable of the invention, the dielectric constant of this insulating separator layer is as low as on the order of 1.1. Furthermore, polystyrene, which heretofore has not been practically used because of difficulty in its fabrication, is easily formed as an excellent insulating separator by using it in the form of chips and causing these chips to foam and simultaneously become mutually bonded.

In coaxial cable of the present invention fabricated as described in connection with FIGS. 6 and 7, particularly in the case wherein foamed polystyrene of a degree of foaming as high as about 97% is used, it is possible to produce an insulating layer having a dielectric constant as low as 1.03.

Furthermore, by the practice of the present invention described in the forgoing disclosure, there is provided a coaxial cable having a fragile material such as foamed polystyrene for the insulating separator layer enclosed within an intimate cohering layer of a pliable material such as polyethylene, whereby it is reinforced, and cracks are prevented from developing in the fragile foamed material. Accordingly, the finished cable is provided with substantial flexibility with respect to bending expected in normal use.

Although this invention has been described with respect to a few embodiments thereof, it is not to be so limited as changes and modifications may be made therein which are within the full intended scope of the invention, as defined by the appended claims.

What we claim and desire to secure by Letters Patent is:

1. A coaxial cable comprising an inner conductor, an insulator circumferentially of said inner conductor, said insulator comprising a brittle foamed synthetic resin and an outer layer of a synthetic resin pliable in comparison with said foamed resin, having a melting point no higher than the melting point of said foamed resin and bonded intimately with said foamed resin, an outer tubular electrical conductor disposed coaxially and circumferentially of said inner conductor, said insulator being disposed internally of said outer conductor and extending coextensively with said inner and outer conductors, and an outer insulating cover circumferentially of said outer conductor.

2. A coaxial cable according to claim 1, in which said foamed resin comprises polystyrene and said outer layer of synthetic resin comprises polyethylene disposed circumferentially of said polystyrene, and in which said insulator is coaxial with said inner and outer conductors.

3. A coaxial cable according to claim 1, further comprising a second insulator concentric of the first mentioned insulator and interposed between the first mentioned insulator and the outer conductor, said second insulator, as the first insulator, comprising a brittle foamed synthetic resin and an outer layer of a synthetic resin pliable in comparison with said foamed resin, having a melting point no higher than the melting point of said foamed resin and bonded intimately with said foamed resin.

4. A coaxial cable according to claim 3, in which said foamed resin comprises polystyrene and said outer layer of synthetic resin comprises polyethylene disposed circumferentially of said polystyrene, and in which said insulator is coaxial with said inner and outer conductors.

References Cited by the Examiner

UNITED STATES PATENTS 3,144,369   8/1964   Foord et al. _____ 147—110 X

FOREIGN PATENTS 868,532   5/1961   Great Britain.

LEWIS H. MYERS, *Primary Examiner.*

H. HUBERFELD, *Assistant Examiner.*